April 17, 1956  G. KERENSKY  2,742,324
HYDRAULIC DISCHARGE REGULATORS
Filed March 7, 1955  5 Sheets-Sheet 1

April 17, 1956  G. KERENSKY  2,742,324
HYDRAULIC DISCHARGE REGULATORS

Filed March 7, 1955  5 Sheets-Sheet 3

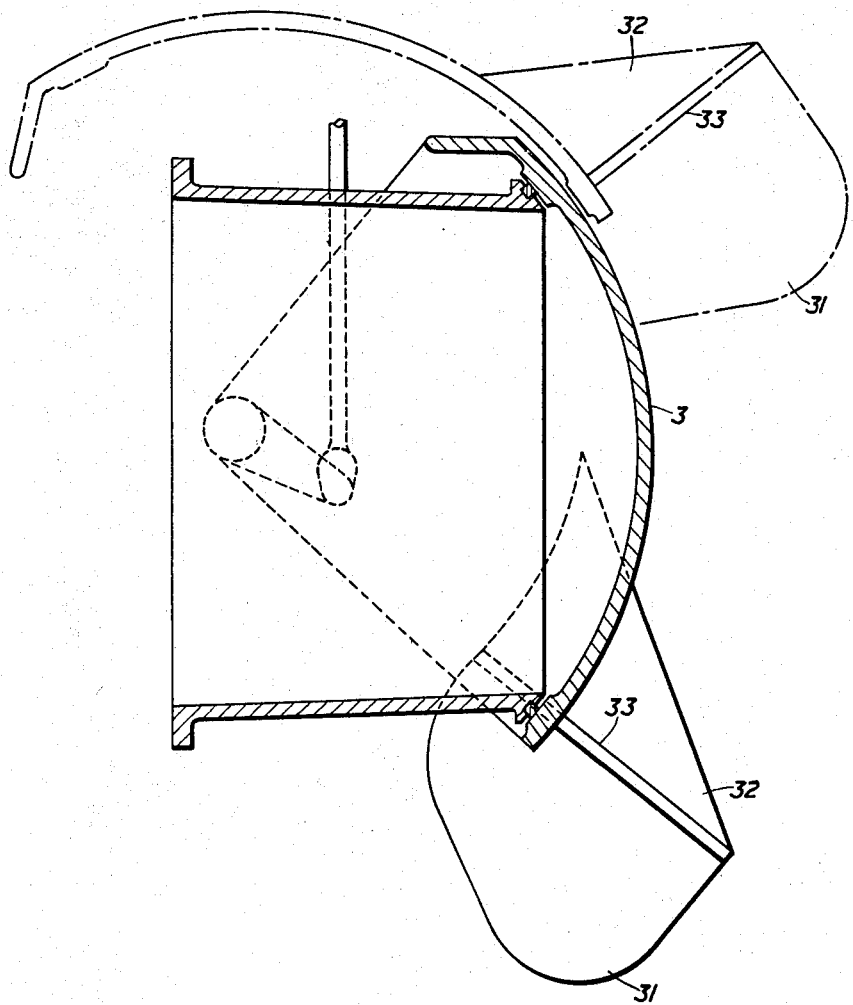

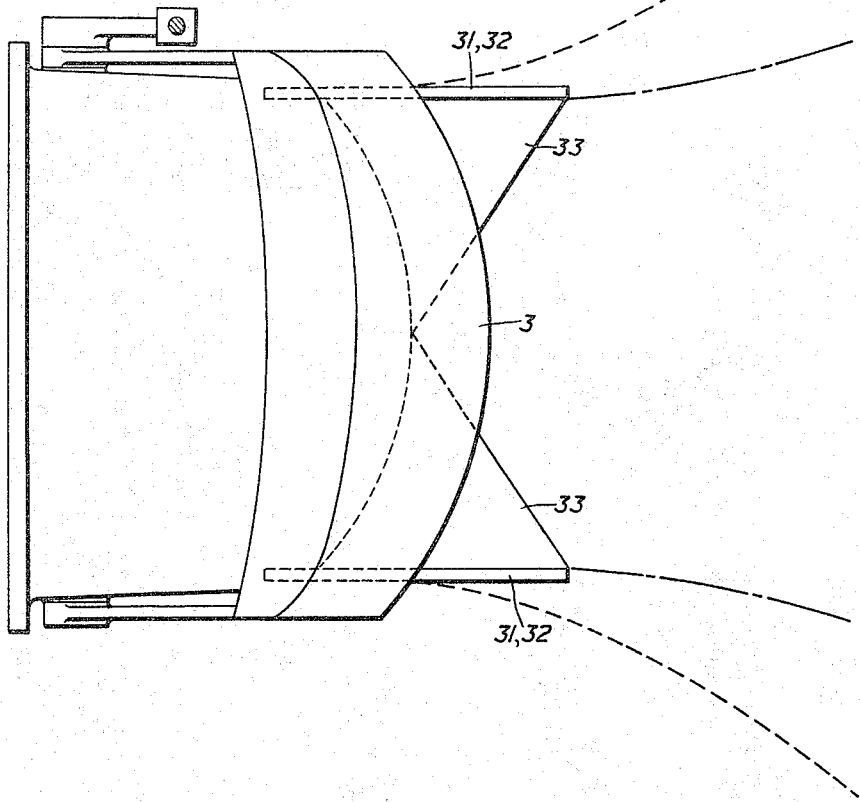

United States Patent Office 2,742,324
Patented Apr. 17, 1956

2,742,324

HYDRAULIC DISCHARGE REGULATORS

Gleb Kerensky, Rugby, England, assignor to The English Electric Company Limited, London, England, a British company Application March 7, 1955, Serial No. 492,663

Claims priority, application Great Britain April 1, 1954

7 Claims. (Cl. 299—118)

The invention relates to hydraulic discharge regulators for the free discharge to atmosphere of considerable quantities of water at variable degrees of opening.

Such discharge regulators usually have a closing member of flat or cylindrical shape.

According to the invention a part-spherical cap attached by lateral cheeks to trunnions transverse of the axis of the discharge pipe is used as a gate which can be swung from the fully closed position in front of the end of the said discharge pipe to a fully open position outside the pipe profile, and which on that part of its edge which is the leading edge in the opening movement, has a deflector pointing back towards the discharge pipe this deflector together with the said cheeks giving the gate a scoop-like shape. In the positions of the said gate intermediate between the fully closed and fully open positions this scoop deflects any water penetrating between the edge of the pipe end and the spherical cap outside the discharge pipe substantially in the direction opposite to the flow inside of the discharge pipe, or in a downward direction which directions are harmless in most situations in which discharge regulators are used.

Preferably the transverse pivot axis about which the spherical cap gate is swung is arranged offset from the centre of the discharge pipe in such a manner that the said gate is pressed against its seat on the mouth of the said discharge pipe in the fully closed position, and is moved sufficiently away from this seat when being opened to obviate frictional resistance to the opening movement. By offsetting the pivot axis of the gate towards that side whereto the said gate is being moved in the opening direction, in the fully closed or almost closed position a torque moment is produced in the sense of opening the gate which is equal to the resultant of the water pressure on the gate by the magnitude of the offset.

Preferably a circular seating strip, machined convex, is provided on the mouth of the discharge pipe, and cooperates with a machined concave sealing face on the gate; thereby the machining required for the two contacting faces is reduced to a minimum.

It is also of advantage to make the end of the discharge pipe slightly convergent in order to maintain a pressure gradient therein which helps to control the discharge flow. Thereby incidentally the structural dimensions of the gate are slightly reduced.

As the jet of water leaving the discharge pipe tends to spread laterally while being cut off by the gate, which is sometimes undesirable, valances may be arranged on the said gate in planes perpendicular to the pivot axis thereof and at a distance substantially corresponding to the inner diameter of the discharge pipe. These valances project beyond that edge of the gate which in the closing operation is the leading edge, and counteract the lateral spreading of the jet to a marked extent.

In order that the invention may be clearly understood and readily carried into effect, some embodiments thereof will now be described by way of example with reference to the accompanying drawings in which:

Fig. 8 is a longitudinal section, and

Fig. 9 is a plan view of a modification of the hydraulic discharge regulator.

Figure 1:
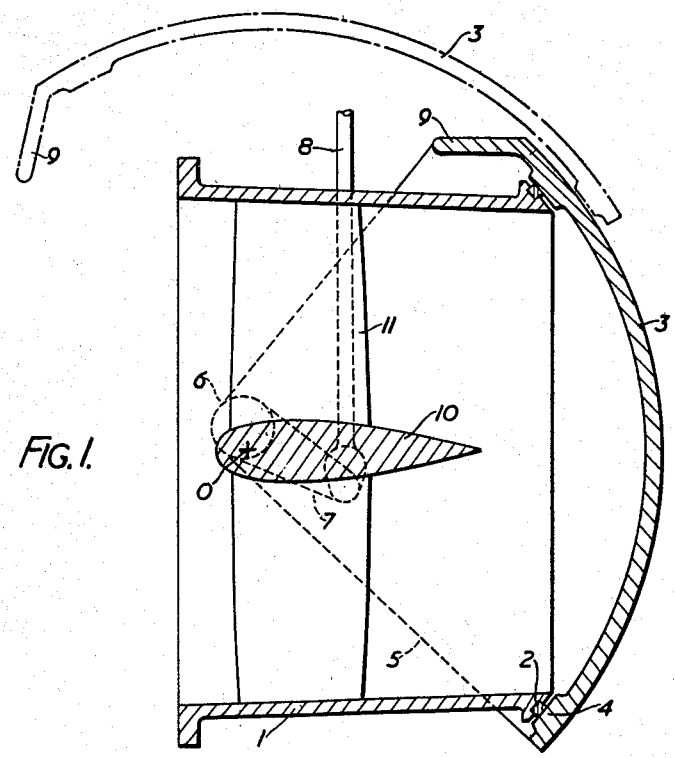
Fig. 1 is a longitudinal section of one embodiment showing the gate in full lines in the closed position and in chain-dotted lines in the fully open position.
Figure 2:
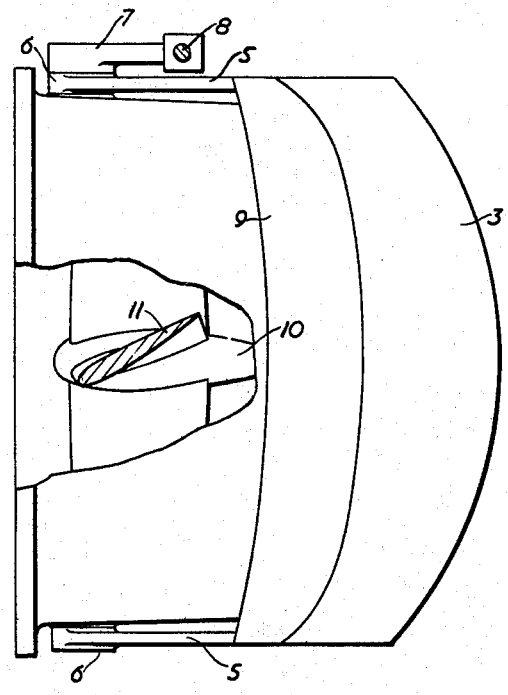
Fig. 2 is a plan view to Fig. 1, partly broken away.

Referring first to Figs. 1 and 2, on the mouth of the slightly converging end piece 1 of the discharge pipe a seating ring 2 is provided which is machined convex about a centre O on the axis of the discharge pipe 1. A part-spherical cap-shaped gate 3 has a concave machined seating face 4, in the fully closed position shown in full lines, firmly contacts the seating ring 2. This spherical cap 3 has two sector-shaped lateral cheeks 5 which are mounted on trunnions 6 offset from the centre line of pipe 1. On one of these trunnions 6 an arm 7 is keyed to which the operating rod 8 is articulated.

On the edge of the spherical cap 3 which in the movement from the fully closed position (as shown in full lines) to the fully open position (as shown in Fig. 1 in chain-dotted lines) is the leading edge, a deflector 9 is arranged, which together with the cap 3 and the cheeks 5 forms a sort of scoop.

The pipe 1 is slightly convergent so as to make sure that the pressure within it is somewhat above the atmospheric pressure, to assure stable conditions of flow and to obviate cavitation. If required a jet dispersing element can be introduced: between a central streamlined hub member 10 and the inner surface of the pipe 1, likewise streamlined vanes 11 can be arranged, which, as shown in Fig. 2, are inclined with respect to the axis of the pipe 1, and accordingly impart a swirling movement on the water which helps the issuing stream to break up harmlessly after leaving the regulator.

Owing to the offset of the trunnions 6 with respect to the centre O of the spherical faces of the seating ring 2 and seating face 4 these two faces are moved apart when opening the gate as will be clearly seen by comparison of the fully closed and fully open positions of the gate 3 in Fig. 1.

Any water emerging through the gap thus opened is deflected by the scoop firstly mainly in the direction back along the pipe 1, and as the opening movement proceeds, mainly in the downward direction.

It will also be clear that pressure of the water, which in the fully closed or nearly closed position of the gate 3 acts on the said gate approximately symmetrical about the centre line of the pipe 1, produces a torque moment in the direction of opening which is equal to the product of the pressure force by the offset of the axis of the trunnions 6 from the centre line of the pipe 1.

In the following figures, components identical with those of the embodiment according to Figs. 1 and 2 are denoted by the same reference numerals.

Figure 3:
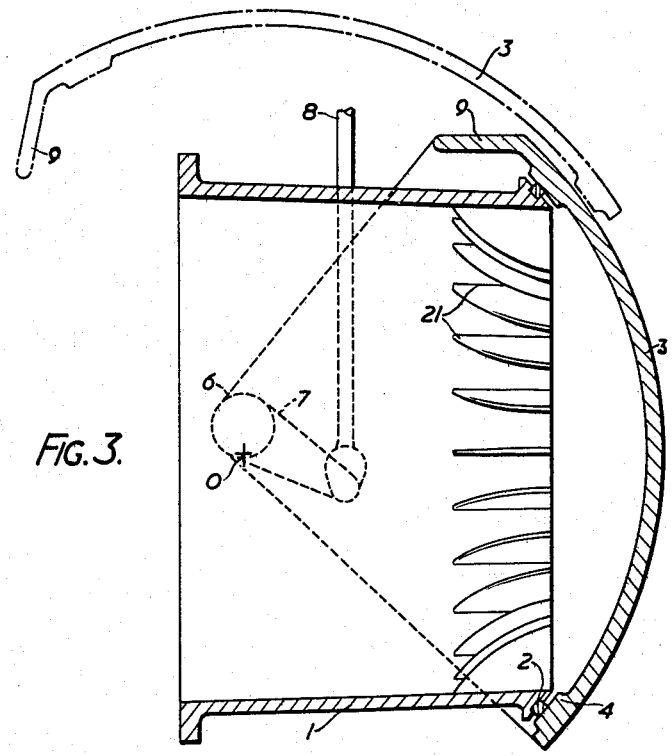
Fig. 3 is a longitudinal section similar to Fig. 1 of another embodiment.
Figure 4:
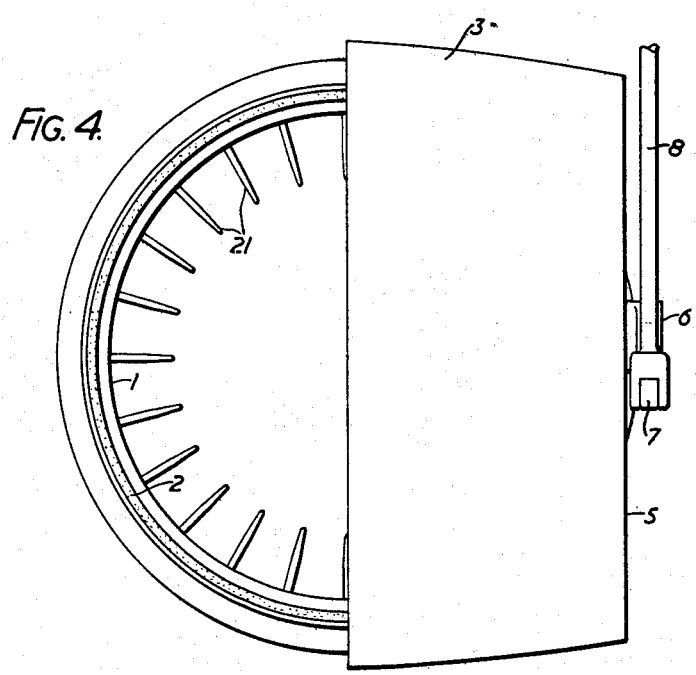
Fig. 4 is an end view to Fig. 3, on the left hand side half with the gate removed.

It will be seen that in the embodiment according to Figs. 3 and 4 the hub member 10 and the vanes 11 have been omitted, and that short radial fins or teeth 21 are provided inside the mouth of pipe 1 which help to break up, and aerate the flow of the water discharged. Otherwise the embodiment according to Figs. 3 and 4 corresponds structurally and functionally to the embodiment according to Figs. 1 and 2.

Figure 5:
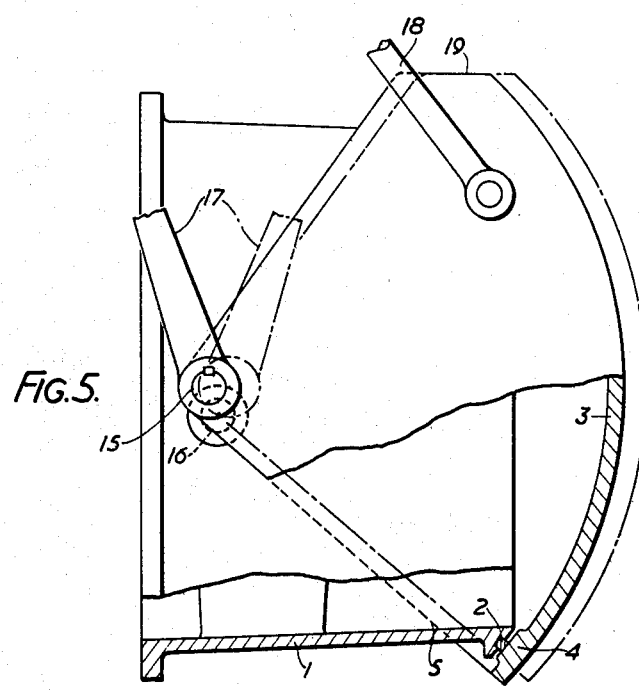
Fig. 5 is a lateral view, partly in section of a third embodiment.
Figure 6:
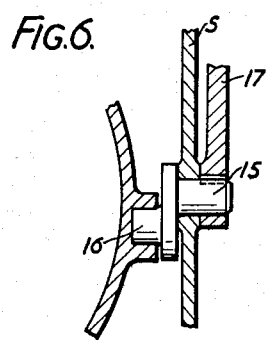
Fig. 6 is a part section transverse of the pipe axis to Fig. 5.

In the embodiment according to Figs. 5 and 6 the trunnions 16 are offset from the centre line of the pipe 1 and carry cranks 15, the axis of which in the closed position as shown in full lines intersects the centre line of the pipe 1. An operating lever 17 is keyed to one of the cranks 15. The gate 5 is pivoted on the crank 15 and operated by a link 18. In operation, firstly the lever 17 is swung into the position shown in Fig. 5 in chain-dotted lines, whereby the gate 3 is bodily removed from the seating ring 2 as shown also in chain-dotted lines. Then the gate is rotated by means of the link 18 about the crank 15 similar to the embodiments described before.

Figure 7:
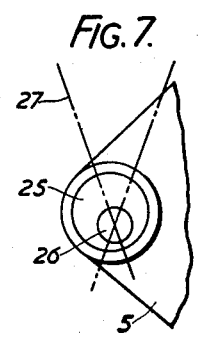
Fig. 7 is a modification of a detail of Fig. 6.

In the modification according to Fig. 7 the gate 5 is mounted on an eccentric 25 the trunnion 26 of which is pivoted on the pipe 1. The eccentric 25 is fixedly connected to the operating lever 27 (indicated only by its centre line) which corresponds to the lever 17 of the embodiment according to Figs. 5 and 6 which is otherwise left unchanged.

Operation of the lever 27 has the same effect of unseating the gate 3 before the same is swung about the eccentric 25. The crank throw according to Figs. 5 and 6 and the eccentricity required in the modification according to Fig. 7 is exaggerated in the drawing for clarity. It may be smaller than the offset according to Figs. 1 to 4, and amount to say ¼" for a pipe diameter of 5' to 10'.

Instead of the crank arrangement of Figs. 5 and 6 or the eccentric arrangement of Fig. 7, the trunnions of the gate 5 could be mounted on parallel slides mounted shiftable in the direction of the pipe axis.

Obviously the various trunnion, crank, eccentric or slide arrangements could be combined with either the oblique vanes according to Figs. 1 and 2 or with the aerating fins according to Figs. 3 and 4, the vanes 11 and fins 21 could also be dispensed with altogether, or the vanes 11 could be shortened and attached to the pipe 1 only while the hub 10 is omitted.

Whereas a slightly convergent or otherwise restricted shape of the pipe 1 is preferred for the reasons given hereinabove, a cylindrical pipe 1 could be used. In this case it may, however, be advantageous, to restrict the opening of the gate 3 from being fully opened, so as to retain always a certain pressure in excess of atmospheric pressure inside the discharge pipe.

Instead of a metal seating ring 2 an inflatable seating ring may be used which would give the best results in conjunction with the offset, cranked or eccentric trunnion arrangements described hereinabove, but might be operated with ordinary trunnions the axis of which intersects the pipe axis. Machining of the concave part-spherical face 4 may then be omitted. The main feature to be applied to all modifications is the deflector on the leading edge of the spherical cap-shaped gate giving the same a scoop shape in conjunction with the lateral cheeks. Without the deflector and lateral cheeks, leakage water would discharge fanwise, upwards as well as downwards when the valve is unsealed or in part-open position, and it would require walls or an outer body of considerable dimensions to contain such jets.

The closing operations obviously take the sequence opposite to that of the opening operations described hereinabove.

Referring now to Fig. 8 valances 31 are fixedly attached to the spherical cap 3 by the aid of ribs 32 and 33 on the outside of the cap 3. The ribs 33 may be in one piece with and/or in continuation of the valances 31, the latter extending beyond that edge of the cap 3 which is the leading edge thereof in the closing operation and lying in planes substantially perpendicular to the pivot axis of the cap 3 and at a distance corresponding approximately to the inner diameter of the discharge pipe.

Fig. 9 shows in dotted lines how without valances the jet of water leaving the end piece of the discharge pipe tends to spread out laterally when the edge of the cap 3 begins to cut it off. This lateral spreading which may be undesirable, is counteracted by the valances 31 which confine the jet laterally as indicated in Fig. 9 in chain-dotted lines which show that the lateral spreading of the jet is substantially reduced by the action of the said valances.

While I have described herein and illustrated in the accompanying drawings what may be considered typical and particularly useful embodiments of my said invention I wish it to be understood that I do not limit myself to the particular details and dimensions described and illustrated, for obvious modifications will occur to a person skilled in the art.

What I claim as my invention and desire to secure by Letters Patent, is:

1. A hydraulic discharge regulator, comprising in combination: a discharge pipe, a part-spherical cap having lateral cheeks pivoted to the said discharge pipe about a transverse axis, the said cheeks flanking the said discharge pipe and the said cap forming a gate rotatable between a position completely obturating the mouth of the said discharge pipe and a position completely clearing the same, and a deflector arranged on that edge of the said cap which in the opening movement thereof is the leading edge pointing back towards the said discharge pipe, the said cap with its lateral cheeks and deflector having the shape of a scoop.

2. A hydraulic discharge regulator as claimed in claim 1, wherein the pivot axis of the said cap is offset from the center of the said discharge pipe in such a manner that the said cap is pressed against the mouth of the said discharge pipe in the fully closed position and is moved away from the said mouth when being opened sufficiently to obviate frictional resistance to the opening movement.

3. A hydraulic discharge regulator as claimed in claim 1, wherein the pivot axis of the said cap is offset from the center of the said discharge pipe towards that side whereto the said cap is being moved in the opening direction, so that in and near the closed position of the said cap a torque moment in the sense of opening the said cap is applied to it by the water pressure.

4. A hydraulic discharge regulator as claimed in claim 1, comprising a circular seating strip machined convex arranged on the mouth of the said discharge tube and co-operating with a machined concave sealing face on the said part-spherical cap.

5. A hydraulic discharge regulator as claimed in claim 1, wherein the end of the said discharge pipe is slightly convergent whereby a pressure gradient therein is maintained.

6. A hydraulic discharge regulator as claimed in claim 1, comprising radial fins inside the mouth end of the said discharge pipe.

7. A hydraulic discharge regulator as claimed in claim 1, comprising valances arranged on said cap in planes perpendicular to the pivot axis thereof and at a distance from one another substantially equal to the diameter of the said discharge pipe, the said valances projecting beyond that edge of the said cap which in the closing operation thereof is the leading edge.

References Cited in the file of this patent
UNITED STATES PATENTS
917,911   Thompson _____ Apr. 13, 1909